[19] United States Patent
Dromard et al.

[11] 4,426,508
[45] Jan. 17, 1984

[54] CATALYTIC PREPARATION OF HIGH MOLECULAR WEIGHT POLYSILOXANES

[75] Inventors: Adrien Dromard, Paris; Claude Millet, Saint-Priest, both of France

[73] Assignee: Rhone-Poulenc Specialites Chimiques, Courbevoie, France

[21] Appl. No.: 377,589

[22] Filed: May 12, 1982

[30] Foreign Application Priority Data

May 12, 1981 [FR] France ................................ 81 09571

[51] Int. Cl.$^3$ .............................................. C08G 77/06
[52] U.S. Cl. ........................................ 528/23; 528/16; 528/17; 528/18; 428/403; 556/462
[58] Field of Search ...................... 528/23, 16, 17, 18; 556/462

[56] References Cited

U.S. PATENT DOCUMENTS 3,222,722  5/1967  Eynon ................................... 528/23
4,038,213  7/1977  McClure et al. ..................... 252/430
4,222,952  9/1980  Vick ..................................... 556/462

Primary Examiner—Melvyn I. Marquis
Attorney, Agent, or Firm—Burns, Doane, Swecker & Mathis

[57] ABSTRACT

Polysiloxanes of relatively low molecular weight are catalytically polymerized/rearranged into high molecular weight polysiloxanes in the presence of a cationic catalyst comprising a porous, inorganic mineral particulate support having an average pore diameter in excess of 20 Å and a pore volume ranging from 0.2 to 2 ml/g, said porous support being coated with less than 15 mg/m$^2$ of a film of polymeric material comprising pendant sulfonic or phosphonic acid functions, and said polymeric material being characterized by an ion exchange capacity of less than 2 milliequivalents per gram.

4 Claims, No Drawings

CATALYTIC PREPARATION OF HIGH MOLECULAR WEIGHT POLYSILOXANES

BACKGROUND OF THE INVENTION

1. Field of the Invention

The present invention relates to a process for the preparation of high molecular weight organopolysiloxanes by the polymerization and rearrangement of low molecular weight organopolysiloxanes in the presence of a catalyst comprising sulfonic or phosphonic acid functions.

2. Description of the Prior Art

A wide variety of processes are known to this art to polymerize and rearrange low molecular weight organopolysiloxanes by acid catalysis, the polysiloxanes being linear and/or cyclic.

These catalysts containing sulfonic acid groups which to date have been used generally consist of cation exchange resins. Thus, U.S. Pat. No. 3,322,722 (Dow Corning) features a batch process for the rearrangement of mixtures of organosilocon compounds containing siloxane, alkoxysilyl and acyloxysilyl linkages, the process being carried out in the presence of a strong acid catalyst, such as the commercial sulfonated resins (Amberlyst 15 and the like.) On catalysts of this type, the siloxane, alkoxysilyl and acyloxysilyl linkages are simultaneously rearranged.

French Patent No. 2,111,629 (Union Carbide) describes a process for the preparation of high molecular weight polysiloxanes by the continuous polymerization and rearrangement of relatively low molecular weight polysiloxane charges, the siloxane charges being passed over a bed of cation exchange resin of the macro-crosslinked sulfonic acid type, having an average pore volume of at least 0.01 cm$^3$/g and preferably of more than 0.03 cm$^3$/g. Macro-crosslinked sulfonic acid resins are described in U.S. Pat. No. 3,037,052. The best results are obtained with Amberlyst 15.

Nonetheless, need exists in this art for improved sulfonic acid catalysts permitting a further increase in productivity, and principally for processes to be carried out continuously (such productivity being expressed, for example, as kg of siloxane charge polymerized and rearranged per hour and per liter of catalyst).

SUMMARY OF THE INVENTION

Accordingly, a major object of the present invention is the provision of improved catalyst/process for the preparation of high molecular weight polysiloxanes, which catalyst/process providing for a marked increase in productivity.

Another object of the invention is the provision of an improved catalyst comprising a porous mineral support impregnated with a polymeric coating material including free acid groups, which catalyst, by reason of the mineral support onto which the acid polymer is grafted/coated, is strikingly resistant to crushing and abrasion, thus enabling same to be used in high pressure applications and which is surprisingly long-lived.

Briefly, the present invention features the preparation of high molecular weight organopolysiloxanes by the polymerization and rearrangement of relatively low molecular weight organopolysiloxanes in the presence of a catalyst comprising acid functions, which preparation is characterized in that the catalyst consists of a porous mineral support having an average pore diameter of more than 20 angstroms and a pore volume ranging from 0.2 to 2 ml/g, said support being coated with an amount of less than 15 mg/m$^2$ of a polymeric material bearing sulfonic or phosphonic acid groups, and possessing an ion exchange capacity of less than 2 milliequivalents per g.

DETAILED DESCRIPTION OF THE INVENTION

More particularly according to this invention, it has now surprisingly been found that the use of the subject catalysts enables preparation of high molecular weight polysiloxanes with a very high productivity, both batchwise and continuously. In particular, it is noteworthy that such productivity is considerably higher than that obtained using other catalysts comprising sulfonic acid groups, of which the physiochemical characteristics and the content of H+ in milliequivalents are of the same order of magnitude as those of the catalysts within the scope of the present invention. Such a result in no event could have been expected.

The supported sulfonic or phosphonic acid catalyst consistent herewith advantageously has a particle size ranging from 4 $\mu$m to 5 mm. The specific surface area of the porous mineral support from which it is derived is not critical and typically ranges from 5 to 500 m$^2$/ and preferably from 50 m$^2$/g to 150 m$^2$/g. The average pore diameter of the porous mineral support typically ranges from 20 angstroms to 3,000 angstroms and preferably from 20 to 2,000 angstroms. The porosity of the porous mineral support preferably ranges from 0.2 to 1.5 ml/g.

The average pore diameter and the porosity are determined by the conventional technique of mercury porometer, by the conventional technique of mercury porometer, by plotting the curve representing the volume or mercury absorbed as a function of the pressure.

Representative of the porous mineral support used to obtain the catalyst, various metal oxides are exemplary, such as titanium oxides, aluminas and silicas. Bodies of siliceous gels having large pores obtained by agglomeration of siliceous hydrogels (drying, calcination, compression extrusion of drops of sols, of oxides and siliceous hydroxides . . . ) are suitable. Thus agglomerated porous silicas such as described in French Patent No. 2 332 234 can be advantageously used. Bodies of siliceous gels having large pores and eventually treated under pressure in autoclave under ammoniacal reaction conditions, can also be used (French Patent No. 2 093 176).

The nature of the polymeric materials which cover or coat the porous mineral support is not critical. Same are characteristically synthetic crosslinked materials or artificial crosslinked materials derived from natural products and the like. The acid functional groups can originally form an integral part of the polymeric material or can be attached to the material, in accordance with any known process, in an additional step.

In general, and according to a preferred embodiment hereof, the polymeric material is synthetic, i.e., a polymer, a copolymer or polycondensate.

Exemplary of the synthetic polymeric materials to which it will subsequently be necessary to attach sulfonic or phosphonic acid groups, there are mentioned, from the group comprising polycondensate, phenolformaldehyde resins, polyepichlorohydrins and the like, and from the group comprising polymers or copolymers, those derived from vinyl monomers, such as, for example, styrene and its derivatives, acrylic, methacrylic and vinylbenzoic acids, which crosslink with polyfunctional monomers such as the diacrylate or dimethacrylate of monoalkylene glycols or polyalkylene glycols, divinylbenzene, vinyltrialkoxysilanes, vinyltrihalogenosilanes and bis-methyleneacrylamide, in the presence of an initiator which releases free radicals, such as organic peroxides and azonitriles, or in the presence of ultraviolet radiation.

The polymeric materials not originally bearing sulfonic or phosphonic acid groups will be modified in accordance with any known process to introduce therein such sulfonic or phosphonic acid groups (compare, for example, *Encyclopedia of Polymer Science and Technology*, Volume 13, "Sulfur-containing Polymers," page 463 et seq.—1970 edition). The groups introduced can be sulfonic acid groups, alkyl sulfonic acid groups (for example, methylsulfonic acid groups) and the like.

The polymeric covering or coating which includes the free sulfonic or phosphonic acid groups can also be directly prepared by the polymerization or copolymerization of sulfonated or phosphonated monomers (ethylenesulfonic acid, methallylsulfonic acid, p-styrenesulfonic acid, vinylphosphonic acid, hydroalkylphosphonate acrylates, and the like).

Such methods are described, for example, in *Encyclopedia of Polymer Science and Technology* (compare reference cited above and Volume 10, "Phosphorus-containing Polymers," page 123 et seq.).

Preferably the functionnal groups acid, sulphonic or phosphonic are introduced in two stages, by impregnating the support and then sulphonating.

Any know technique can be used for obtaining a covering of polymeric material on the mineral support. Obviously the covering or depositing is not necessarily a continuous coating. For example, it is possible to impregnate the support with a solution of the monomer or monomers, and, if appropriate, of the catalyst, in a solvent which permits a good distribution of the monomers over the entire surface area of the mineral support, with the solvent then being evaporated off and the monomers crosslinked in accordance with known processes; this procedure constitutes a particularly advantageous embodiment of the invention. The solvent used is any product which is a solvent for the monomers and the catalyst and the boiling point of which being less than or equal to 80° C. and which preferably is as low as possible in order to assist its subsequent evaporation.

Examples of such solvents are methylene chloride, ethyl ether, benzene, acetone and ethyl acetate.

In the actual coating of the mineral support, the amount of monomer(s) to be used must be such that the amount of crosslinked polymer possessing functional groups, distributed over the surface of the mineral support, is less than 15 and preferably ranges from 0.3 to 8 mg/m$^2$.

According to another preferred embodiment of the invention, the mineral support has a particle size ranging from 4 μm to 5 mm; its average pore diameter ranges from 20 to 2,500 angstroms and its pore volume ranges from 0.2 to 1 ml/g.

According to yet another preferred embodiment, the supported catalyst comprises sulfonic acid groups. Advantageously, the ion exchange capacity of such catalyst is less than 1 milliequivalent of H+ per gram.

Thus, the present invention envisages the polymerization/rearrangement of siloxane compounds consisting of cyclosiloxanes and/or acyclic organopolysiloxanes of relatively low molecular weight.

The polymerizable cyclosiloxanes advantageously employed have the structural formula (I):

in which the various symbols represent the following:

n: an integer which is greater than or equal to 3;

$R_1$: a hydrogen atom; an alkyl, alkenyl, halogenoalkyl or halogenalkenyl radical, these various radicals having from 1 to 5 carbon atoms and, if appropriate, containing from 1 to 6 chlorine and/or fluorine atoms; a cycloalkyl or cycloalkenyl radical, these radicals having from 3 to 8 carbon atoms and optionally being substituted by 1 to 4 chlorine and/or fluorine atoms; a cyanoalkyl radical having from 3 to 4 carbon atoms; or a phenyl, alkylphenyl or phenylalkyl radical having from 6 to 8 carbon atoms, these radicals optionally being substituted by 1 to 4 chlorine and/or fluorine atoms; and $R_2$: a radical such as $R_1$ or alternatively an alkoxy group —$OR_3$, $R_3$ having the same meaning as $R_1$:

By way of illustration, the following radicals are exemplary of the radicals $R_1$:

(i) a hydrogen atom; and (ii) the following groups: methyl, ethyl, propyl, isopropyl, butyl, isobutyl, α-pentyl, t-butyl, chloromethyl, dichloromethyl, α-chloroethyl, α,β-dichloroethyl, fluoromethyl, difluoromethyl, α,β-difluoroethyl, 3,3,3-trifluoropropyl, trifluorocyclopropyl, 4,4,4-trifluorobutyl, 3,3,3,4,4,5,5-heptafluoropentyl, β-cycanoethyl, γ-cyanopropyl, phenyl, p-chlorophenyl, m-chlorophenyl, 3,5-dichlorophenyl, trichlorophenyl, tetrachlorophenyl, o-, p- or m-tolyl, α,α,α-trifluorotolyl, and xylyl, such as 2,3-dimethylphenyl and 3,4-dimethylphenyl.

Preferably, n is equal to 3, 4, 5 or 6 and even more advantageously 3 or 4, $R_1$ represents a hydrogen atom; a methyl or vinyl radical, these radicals optionally being substituted by one or two chlorine and/or fluorine atoms; or a phenyl, tolyl or xylyl radical optionally substituted by one or two chlorine and/or fluorine atoms, and $R_2$ preferably represents hydroxyl or methoxy radicals, in addition to the preferred meanings of the radical $R_1$.

Quite advantageously consistent herewith, the cyclosiloxanes polymerized consist of hexamethylcyclotrisiloxane ($D_3$) and/or octamethylcyclotetrasiloxane ($D_4$).

By way of illustration, the following are exemplary of the cyclosiloxanes which can be used within the scope of the present invention: hexamethylcyclotrisiloxane ($D_3$), octamethylcyclotetrasiloxane ($D_4$), octaphenylcyclotetrasiloxane, tetramethylcyclotetrasiloxane and tetramethyltetravinylcyclotetrasiloxane.

Also within the scope of the present invention, it is envisaged to polymerize and rearrange siloxane compounds consisting of cyclosiloxane compounds of the formula (I) in combination with acyclic organopolysiloxanes of relatively low molecular weight and of linear, branched or crosslinked type.

These organopolysiloxanes, which contain at most 200 silicon atoms per mol and the nature of which is not critical, consist of units of the general formula (II):

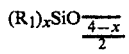

(II)

optionally in combination with units of the formula (III):

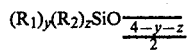

(III)

the various symbols having the following meanings:

$R_1$: a hydrogen atom; an alkyl, alkenyl, halogenoalkyl or halogenoalkenyl radical, these various radicals having from 1 to 5 carbon atoms and, if appropriate, containing from 1 to 6 chlorine and/or fluorine atoms; a cycloalkyl or cycloalkenyl radical, these radicals having from 3 to 8 carbon atoms and optionally being substituted by 1 to 4 chlorine and/or fluorine atoms; a cyanoalkyl radical having from 3 to 4 carbon atoms; or a phenyl, alkylphenyl or phenylalkyl radical having from 6 to 8 carbon atoms, these radicals optionally being substituted by 1 to 4 chlorine and/or fluorine atoms;

$R_2$: a radical such as $R_1$ or alternatively an alkoxy group $-OR_3$, $R_3$ having the same meaning as $R_1$;

x and y: integers equal to 0, 1, 2 or 3; and z: an integer which is equal to or less than 2.

Preferably, the siloxane compounds to be polymerized, which consist of a mixture of cyclosiloxanes and acyclic organopolysiloxanes, comprise at least 50% by weight of the cyclosiloxanes. In this case, it is advantageous to polymerize mixtures containing at least 50% of $D_3$ and/or $D_4$, the remainder consisting of a linear organopolysiloxane "$M_2D_p$" having the formula (IV):

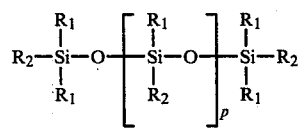

(IV)

with the various symbols having the following meanings;

p: an integer ranging from 1 to 100; and $R_1$ and $R_2$: the same meaning as those above indicated for the cyclosiloxanes.

Among the organosiloxanes of low molecular weight and linear structure, exemplary are: hexamethyldisiloxane, tetramethyldivinyldisiloxane, α,ω-bis-hydroxydimethylsilyl-polydimethylpolysiloxanes, α,ω-dimethoxypolydimethylpolysiloxanes, tetraphenyldisiloxanediol and α,ω-dihydrogenopolydimethylpolysiloxanes.

Finally, it too is within the scope of the present invention, to polymerize and rearrange linear or branched acyclic organopolysiloxanes such as defined above.

When linear or branched acyclic organopolysiloxane have hydroxysilyl groups, it is possible, moreover to the reactions of polymerisation and or rearrangement to realize as a whole the reaction of polycondensation of Si—OH groups if water produced by the reaction is removed progressively as soon as its formation occured; one can use any suitable mean (azeotropic distillation, gas bubbling . . . ).

It will of course be appreciated that it is also within the scope of the invention to use, in combination with the organosiloxanes to be polymerized and rearranged, such as defined above, a small amount, representing, for example, up to 20% by weight, of a silane comprising one or more alkoxy groups, such as, for example, methyltriethoxysilane, vinyl-tris-(methoxyethoxy)-silane and phenyltriethoxysilane.

The process according to the invention can be carried out batchwise or continuously, at a temperature ranging from 20° to 200° C., preferably from 40° to 160° C. The polymerization and the rearrangement can optionally be carried out in a solvent or non-solvent medium. If it is decided to use a solvent, such will be selected from among any of the solvents which can be used for the polymerization of cyclosiloxanes; the following are exemplary of these solvents: benzene, toluene, THF, dioxane and the like. Preferably, the process according to the invention is carried out in a non-solvent medium.

The technique described above is of considerable value in the polymerization of siloxanes on an industrial scale, in a continuous or batch process. In a continuous process, the productivity, expressed in kg of siloxane polymerized per hour per liter of catalyst, is on the order of 15 kg/hour/l or more. This technique makes it possible, in particular, to prepare organosilicon oils of the methyl, methylphenyl or methylvinyl type, the viscosities of which generally range from 0.1 to 5,000 m Pas and advantageously range from 1 to 1,000 m Pas.

In order to further illustrate the present invention and the advantages thereof, the following specific examples are given, it being understood that same are intended only as illustrative and in nowise limitative.

EXAMPLE I

A mixture of octamethylcyclotetrasiloxane ($D_4$) and hexamethyldisiloxane ($M_2$) was introduced into a stirred reactor. After heating at 80° C., the catalyst was added in predetermined amount. The change in the composition of the reaction mass as a function of the polymerization time was subsequently determined, which made it possible to determine the time required to reach equilibrium. By comparing the stirred reactor with a perfect reactor, this value enabled calculation of the productivity, which is expressed as the amount of charge treated per hour and per kg of catalyst. This productivity can readily be converted to kg/hour and per liter of reactor, given the fact that the bulk density of the catalysts tested was 0.66 g/ml.

The characteristics of the agglomerated silica particles and of the catalysts, and also the results, are reported in the following Table I:

TABLE I

| | DESCRIPTION OF THE CATALYST | | | | | | | |
|---|---|---|---|---|---|---|---|---|
| | Description of the mineral support | | | | Amount of polymeric material mg/m² | Milli-equivalent of H⁺/g | Viscosity of the PDMS* oil obtained in m Pas | Productivity in kg/hour/l of catalyst |
| Experiment | Particle Size in microns | Average pore diameter in angstroms | Porosity in ml/g | Acid group | | | | |
| 1 | 100–200 | 86 | 0.97 | sulfonic | 0.70 | 1.13 | 350 | 7.1 |
| 2 | 100–200 | 86 | 0.97 | sulfonic | 0.78 | 1.36 | | 11.2 |

TABLE I-continued

DESCRIPTION OF THE CATALYST

| | Description of the mineral support | | | | Amount of | | Viscosity of | Productivity |
|---|---|---|---|---|---|---|---|---|
| Experiment | Particle Size in microns | Average pore diameter in angstroms | Porosity in ml/g | Acid group | polymeric material mg/m$^2$ | Milli-equivalent of H$^+$/g | the PDMS* oil obtained in m Pas | in kg/hour/1 of catalyst |
| 3 | 100–200 | 86 | 0.97 | sulfonic | 0.80 | 1.44 | | 10.1 |
| 4 | 100–300 | 140 | 1.0 | sulfonic | 1.4 | 1.22 | 350 | 11.2 |
| 5 | 100–200 | 280 | 1.05 | sulfonic | 2.30 | 0.97 | 350 | 28.4 |
| 6 | 100–200 | 280 | 1.05 | sulfonic | 1.73 | 0.83 | | 29.6 |
| 7 | 100–200 | 280 | 1.05 | sulfonic | 1.37 | 0.66 | | 26.5 |
| 8 | 100–200 | 280 | 1.05 | sulfonic | 1.27 | 0.57 | | 28.1 |
| 9 | 100–200 | 280 | 1.05 | sulfonic | 0.81 | 0.37 | | 17.9 |
| 10 | 100–300 | 1,100 | 1.05 | sulfonic | 4.3 | 0.60 | 350 | 24.3 |
| 11 | 100–300 | 1,100 | 1.05 | sulfonic | 2.2 | 0.32 | 350 | 20.2 |
| 12 | 100–200 | 3,200 | 1.15 | sulfonic | 4.1 | 0.25 | 350 | 14.1 |

*PDMS: polydimethylsiloxane

By way of comparison, the same reaction was carried out using, as the catalyst, Amberlyst ® 15 from Rohm and Haas. This catalyst, which is an entirely polymeric resin of the macro-crosslinked sulfonic acid type, had the following characteristics:

(i) Porosity: 0.70 ml/g
(ii) Average pore diameter: 312 angstroms
(iii) Milliequivalents of H$^+$/g: 4.9
(iv) Particle size: 1 to 1.25 mm
(v) Specific surface area: 45 m$^2$/g The measured productivity in terms of polydimethylpolysiloxane oil was only 6.3 kg/hour/liter of catalyst.

The catalysts were prepared in accordance with the same procedure. By way of illustration, the preparation of the catalyst used in experiment No. 8 will be described: 100 g of silica having a particle size of 100 to 200 microns, a specific surface area of 108 m$^2$/g, an average pore diameter of 280 angstroms and a porosity of 1.05 ml/g were dried at 150° C. under reduced pressure for 5 hours; the dry silica obtained was introduced into a solution of 250 ml of methylene chloride, 30 ml of styrene, 15 ml of vinyltriethoxysilane and 0.5 g of azo-bis-isobutyronitrile.

The methylene chloride was evaporated off at ambient temperature and the impregnated silica was then heated at 120° C. for 6 hours at atmospheric pressure, in order to effect crosslinking.

The crosslinked silica was then suspended in 400 ml of methylene chloride and the suspension was heated under boiling for 2 hours. After filtration, the silica was washed with acetone and then dried. Analysis indicated carbon content of 7.6% by weight, relative to the silica covered.

50 g of the product silica were suspended in 150 ml of methylene chloride. After 50 ml of chlorosulfonic acid has been introduced therein at ambient temperature, over a period of 30 minutes, the reaction mass was stirred for 2 hours at ambient temperature.

The silica was filtered off, washed successively with 200 ml of methylene chloride, 100 ml of acetone and softened water until the washings were neutral, the silica washed in this manner was then suspended in 250 ml of softened water and the suspension was heated under reflux for 1 hour. After filtration, washing with softened water until the washings were neutral, and then drying in vacuo at 50° C., a silica was obtained which was grafted with cation exchange groups of the strong type:

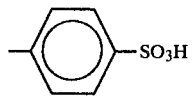

which had the following characteristics:
%C=7.5
%S=2.1
Ion capacity=0.57 miliequivalent/g
Amount of organic material=1.27 mg/m$^2$.

EXAMPLE 2

Continuous Experiments

The reactor essentially consisted of a stainless steel tube of diameter 2.5 cm and height 18.5 cm, which corresponded to a useful volume of 91 cm$^3$; this tube was obstructed at both ends by sintered stainless steel discs (class No. 10) and contained 91 cm$^3$ of catalyst. The charge, consisting of 124 g of M$_2$ and 876 g of D$_4$, was charged into the reactor through the bottom, at variable rates, via a piston pump. The temperature of the reactor was maintained at 75° C.

For each feed rate, analysis of the composition of the effluent made it possible to calculate the yield of polymer and the degree of conversion of the D$_4$ and of the M$_2$. The productivity (P) was calculated taking into account the volume of the catalyst bed and the maximum feed rate (Qm,kg/hour) of the charge which made it possible to preserve equilibrium of the reaction:

$$P = Qm \times 1,000/91 \text{ kg/hour/l.}$$

With the catalyst described in Experiment No. 4 of Example I, the productivity determined was 15 kg/hour/liter of catalyst.

The productivity was measured under the same conditions with amberlyst 15 being substituted for the catalyst. A productivity of 6 kg/hour/liter of catalyst was found.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

EXAMPLE 3

In the reactor of the example 1 with N₂ bubbling (5 l/h) as means for the elimination of water produced during the reaction, one introduced 150 g of a mixture containing 130 g of α, ω-bishydroxy polydimethylpolysiloxane ($M_n$: 2900; viscosity 120 mPa/s at 25° C.) and 20 g of hexamethyldisiloxane ($M_2$).

The catalyst is the one of experiment No. 7 of example 1. The temperature is maintained at 150° C.

The rate of conversion of OH is determined: at the end of the reaction there are less 200 mmg/kg of hydroxyl group. The productivity is 30 kg/h/l.

EXAMPLE 4

The reactor essentially consists of a stainless steel tube of diameter 50 mm and height 15 mm which corresponds to a useful volume of 29.45 cm³. This tube is obstructed at both ends by sintered stainless steel discs and is full of catalyst (13 g) obtained as in the first example from bodies of siliceous gels having the following description:

| | |
|---|---|
| particle size in microns | 100–300 |
| average pore diameter in angstrom | 1100 |
| porosity in ml/g | 1.05 |
| amount of polymeric material mg/m² | 4.2 |
| milli equivalents of $H^{30}$ | 0.5 |

To a charge consisting of 77% of cyclodimethylsiloxanes $D_n$ ($3 \leq n \leq 6$) and 23% of α,ω-dihydroxypolydimethylsiloxane having between 0.8 and 1.5 g of hydroxyl group by kg is added at variable rates hexamethyldisiloxane. This novel charge is fed through the bottom at variables rates via a piston pump. The temperature of the reactor is kept at 150° C. The productivity is calculated as in the example 2. The % of hexamethyldisiloxane is 13.4 g per 100 g of charge. The polymer has a viscosity of 21 mPa/s at 25° C. The productivity is of 34.2 kg/h/l.

EXAMPLE 5

This example is the same as the example 1 but hexamethyldisiloxane is, substituted by tetramethyldisiloxane ($M'_2$).

The catalyst is the one of experiment No. 7 of example 1. The temperature is maintained at 85° C.

With a % of tetramethyldisiloxane ($M'_2$) of 304, the viscosity of the polymer is 4.6 mPa/s. The productivity is 24,2 kg/h/l.

The quantity of Si—H group remain the same.

EXAMPLE 6

According to the procedure of example 5 one realize the reaction of polymerization and rearrangement on a charge consisting of dimethylcyclosiloxane ($D_n$) methylhydrogenocyclosiloxane ($D'_n$) and hexamethyldisiloxane ($M_2$)

The temperature is 60° C.

The charge contains 66.2 g of ($D'_4$), 853 g of ($D_4$) and 80.3 g of ($M_2$). The polymer has a viscosity of 25.2 mPa/s.

The productivity is 19.9 kg/h/l.

What is claimed is:

1. A process for the preparation of a high molecular weight polysiloxane, comprising polymerizing/rearranging a polysiloxane of lower molecular weight in the presence of a catalyst comprising a porous, inorganic mineral particulate support having an average pore diameter in excess of 20 Å and a pore volume ranging from 0.2 to 2 ml/g, said porous support being coated with less than 15 mg/m² of a film of polymeric material comprising pendant sulfonic or phosphonic acid functions, and said polymeric material being characterized by an ion exchange capacity of less than 2 milliequivalents per gram.

2. The process as defined by claim 1, said polysiloxane of lower molecular weight comprising a cyclosiloxane having the recurring units (I):

wherein n is an integer of at least 3; $R_1$ is hydrogen, alkyl, alkenyl, halogenoalkyl or halogenoalkenyl having from 1 to 5 carbon atoms, which radicals may be substituted with from 1 to 6 chlorine and/or fluorine atoms, cycloalkyl or cycloalkenyl having from 3 to 8 carbon atoms, which radicals may be substituted with from 1 to 4 chlorine and/or fluorine atoms, cyanoalkyl having from 3 to 4 carbon atoms, phenyl, alkylphenyl or phenylalkyl having from 6 to 8 carbon atoms, which radicals may be substituted with from 1 to 4 chlorine and/or fluorine atoms; and $R_2$ is hydrogen, $R_1$, hydroxy or —$OR_3$, with $R_3$ being defined as is $R_1$.

3. The process as defined by claim 2, said polysiloxane of lower molecular weight which includes no more than 200 silicon atoms per mol comprising admixture of said cyclosiloxane (I) with units of the formula (II):

or admixture of said cyclosiloxane (I) and units of the formula (II) with units of the formula (III):

wherein x and y are integers of 0, 1, 2 or 3, and z is an integer of no more than 2, wherein $R_1$ is hydrogen, alkyl, alkenyl, halogenoalkyl or halogenoalkenyl having from 1 to 5 carbon atoms, which radicals may be substituted with from 1 to 6 chlorine and/or fluorine atoms, cycloalkyl or cycloalkenyl having from 3 to 8 carbon atoms, which radicals may be substituted with from 1 to 4 chlorine and/or fluorine atoms, cyanoalkyl having from 3 to 4 carbon atoms, phenyl, alkyl phenyl or phenylalkyl having from 6 to 8 carbon atoms, which radicals may be substituted with from 1 to 4 chlorine and/or fluorine atoms; and $R_2$ is hydrogen, $R_1$, hydroxy or —$OR_3$, with $R_3$ being defined as is $R_1$.

4. The process as defined by claim 3, said polysiloxane of lower molecular weight comprising at least 50% by weight of hexamethylcyclotrisiloxane, octamethylcyclotetrasiloxane, or admixture thereof, and up to 50% by weight of a linear organopolysiloxane having the formula (IV):

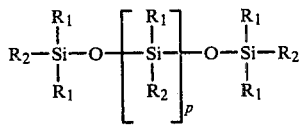 (IV)

wherein p is an integer ranging from 1 to 100, wherein $R_1$ is hydrogen, alkyl, alkenyl, halogenoalkyl or halogenoalkenyl having from 1 to 5 carbon atoms, which radicals may be substituted with from 1 to 6 chlorine and/or fluorine atoms, cycloalkyl or cycloalkenyl having from 3 to 8 carbon atoms, which radicals may be substituted with from 1 to 4 chlorine and/or fluorine atoms, cyanoalkyl having from 3 to 4 carbon atoms, phenyl, alkyl phenyl or phenylalkyl having from 6 to 8 carbon atoms, which radicals may be substituted with from 1 to 4 chlorine and/or fluorine atoms; and $R_2$ is hydrogen, $R_1$, hydroxy or $-OR_3$, with $R_3$ being defined as is $R_1$.

* * * * *